United States Patent Office 3,401,791
Patented Sept. 17, 1968

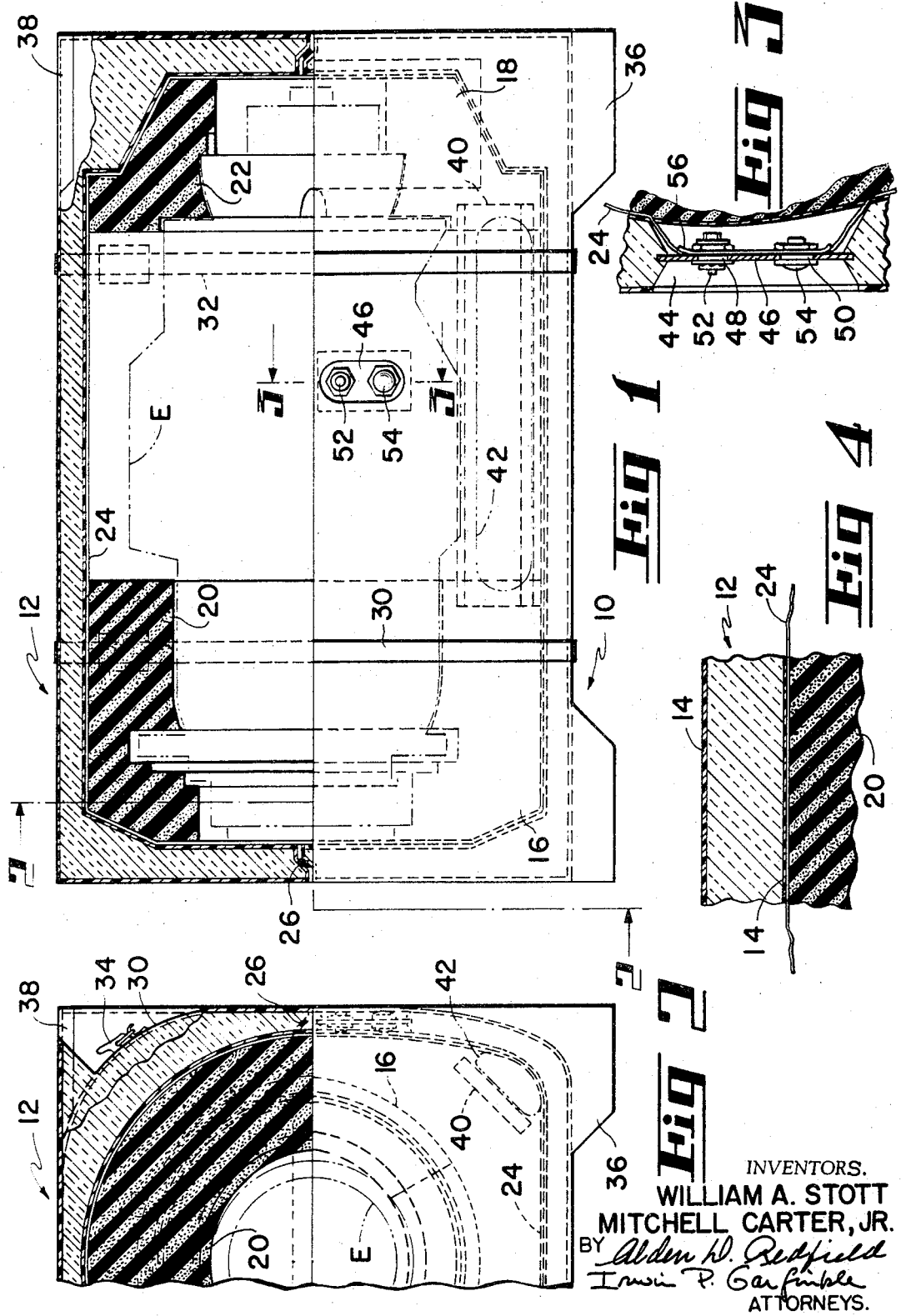

3,401,791
REUSABLE SHIPPING AND STORAGE CONTAINER
William A. Stott, Shelton, Conn., and Mitchell Carter, Jr., Titusville, N.J., assignors to Avco Corporation, Stratford, Conn., a corporation of Delaware
Filed Nov. 30, 1965, Ser. No. 510,578
6 Claims. (Cl. 206—46)

ABSTRACT OF THE DISCLOSURE

A reusable container for gas turbine engines is provided with a rigid foam plastic exterior casing, a flexible foam rubber interior casing, and a sealed moistureproof, vaporproof bag positioned between the rigid and flexible casings.

---

This invention relates to a novel package for long-term storage and shipment of heavy weight, large size, delicate equipment, such as aircraft gas turbine or piston engines.

For shipping and storing equipment such as engines, an inexpensive, lightweight, reusable container is required which is able to protect the equipment from damage due to vibration or impact, and which can be sealed to the extent necessary to control the internal moisture and pressure level. It is the object of this invention to provide such a container.

In general, the novel container of this invention is made up of three parts; a rigid foam plastic exterior casing, a flexible foam rubber interior casing, and a moistureproof, vaporproof, sealed bag between the rigid exterior casing and the flexible foam rubber interior casing. The rigid exterior foam plastic casing of the container consists of two rigid polyurethane foam preform portions making up an upper half and a bottom half, with skids molded into the bottom half. The bottom half is also provided with a two-way pressure relief valve for controlling the pressure limits and a humidity indicator for indicating the moisture level within the container when sealed. The flexible interior foam rubber casing includes two or more preform supports, having the general configuration of the engine to be supported, positioned within the rigid exterior portion. Between the rigid exterior casing halves and the flexible interior foam rubber casing is a moistureproof, vaporproof, sealable, plastic barrier bag. The exterior rigid preform is lined inside and out with a fiber glass cloth molded into its surface.

It is an object of this invention to provide a shipping and long-term storage container for an engine, or other high density, fragile article, said container having a rigid foam exterior casing, flexible foam interior casing, formed generally to the configuration of the engine, and a sealable moisture and vapor barrier bag positioned between the rigid and flexible foam portions of the container.

Another object of this invention is to provide such a container in which the rigid casing is made of foamed polyurethane having a fiber glass cloth molded in the surface thereof.

Another object of this invention is to provide such a container having means for regulating the pressure and providing an indication of humidity therein.

Still another object of this invention is to provide such a container which is indefinitely reusable.

For further objects and for a better understanding of this invention, reference should now be made to the following specification and to the accompanying drawings in which:

FIGURE 1 is a front elevation, partly in section, showing a shipping container for a gas turbine engine;

FIGURE 2 is a view, partly in section, taken through the line 2—2 in FIGURE 1;

FIGURE 3 is a section taken through the line 3—3 in FIGURE 1, showing the arrangement of the humidity indicator and the pressure relief valve; and FIGURE 4 is a view showing a small enlarged section of the container portions.

The illustrated container is designed for storing and shipping a gas turbine engine E drawn in phantom line. It will be understood that the principles of construction of this container will also be adaptable to any other type of article, although its maximum utility is realized when used in conjunction with heavy, fragile articles, such as gas turbine or piston engines.

The container comprises a molded exterior rigid casing having a bottom half 10 and a complementary top half 12. The casing halves 10 and 12 are preforms made by foaming polyurethane in a suitable mold, the mold having first been lined with a porous fiber glass fabric lining 14 so that substantially the entire exterior and interior surfaces of the halves 10 and 12 are lined and thus reinforced against sharp impact. The fiber glass fabric lining 14 on the casing half 12 is illustrated only in FIGURE 4.

The interior casing of the container is comprised of four flexible foam preform engine supports 16, 18, 20, and 22, two each positioned in the top and bottom halves of the rigid casing. The flexible foam supports 16, 18, 20, and 22 conform to the interior configuration of the rigid casing 10 and 12, and also to the configuration of the engine to be supported therein. Note, however, that where the engine E is circular in cross section, the preforms 16, 18, 20, and 22 when in position are originally elliptical. When the engine is installed, the flexible supports conform to the engine, and this feature provides a preload of the engine to insure against movement within the container, even at high accelerations.

As best seen in FIGURES 3 and 4, a plastic sealable bag 24 is positioned between the rigid exterior casing halves 10 and 12 and the flexible interior supports 16, 18, 20, and 22.

A compressible rubber seal 26 extends around the entire periphery of the lower half of the rigid casing 10, and the two edges 10 and 12 are secured together by means of pairs of straps 30 and 32 each molded into the rigid exterior casing halves 10 and 12. The straps 30 and 32 are clamped by any convenient means, such as shown at 34.

The bottom half 10 of the rigid exterior casing is provided with skids 36 molded on the bottom to accommodate material handling equipment. The top half casing 12 is provided with depressions 38 complementary with the skids 36 to facilitate stacking of the containers.

A very lightweight foam strip 40, positioned within the plastic bag 24 within the bottom half 10 of the rigid casing, serves to maintain one or more desiccant bags 42 in place.

To store and ship an engine, the plastic sealable bag 24 is first positioned in the bottom half 10 of the rigid exterior casing 10. Thereafter the interior flexible foam rubber preform supports 16 and 18 are positioned in the bag 24 within the bottom half 10. The bag 24 is left open to expose the supports so that the engine may next be mounted on the supports which are formed to accommodate the configuration of the engine, except that the vertical dimension of the supports is somewhat less than the vertical dimension actually required for containing the engine. The upper interior flexible foam rubber supports 20 and 22 are then placed on the engine, and thereafter the plastic barrier bag 24 is closed and sealed to enclose the entire engine and the four flexible supports. Sealing of the bag 24 is preferably performed by a heat sealing method. The upper casing half is then placed in position on the lower casing, and the upper and lower casings are clamped together by means of the straps 30 and 32 and the clamping mechanisms 34.

As seen in FIGURE 3, an opening 44 is provided in the front of the lower half 10 of the rigid casing. This opening is closed by means of a plate 46 molded into the casing. Two circular apertures 48 and 50 are provided in the plate 46. The aperture 48 serves to house a two-way pressure relief valve 52. The aperture 50 serves to house a humidity indicator 54. Both the pressure relief valve 52 and the humidity indicator 54 are well known in the art, and for that reason are not shown in detail in the drawing. Suffice it to say that the relief valve 52 serves to allow the container to "breathe" with changes in atmospheric pressure beyond specified limits; that is, with a large change in pressure resulting, for example, from change in altitude, the valve 52 will allow for some equalization of the internal and external pressures. The humidity indicator merely provides a transparent partition through which a humidity gage, such as moisture-sensitive paper, can be viewed. Both the pressure relief valve and the humidity indicator extend from outside the casing 10 to the interior of the sealed plastic barrier bag 24, appropriate apertures having been made in the bag for that purpose and having been sealed by means of an appropriately secured gasket 56.

Thus, there has been provided a container comprising a rigid outer casing, a flexible inner casing or support, and a sealable, moistureproof, vaporproof, protective barrier bag surrounding the article to be stored and the flexible inner casing or support. A humidity indicator and a two-way pressure relief valve communicate between the interior of the barrier bag and the exterior of the rigid casing, thereby providing means for pressure regulation and for indicating the amount of moisture within the bag. Desiccant bags retained within the barrier bag maintain the humidity and moisture at a low level over an extended period of time.

Because the plastic barrier bag is located between the rigid foam exterior casing and the flexible foam rubber interior casing or supports, the possibility of protrusions on the article being stored puncturing the barrier bag is substantially reduced. Nevertheless, the foam rubber supports allow sufficient movement of the article within the bag to reduce shock loads. The rigid exterior container protects against exterior damage caused in shipment or by material handling, while the interior foam rubber casing or support protects against damage caused by outside stresses and resultant loads on the article stored. The combination of the rigid outer foam casing with the interior foam rubber casing protects the plastic barrier bag.

Thus, the container has long-term storage capabilities since the plastic barrier bag, in combination with the desiccants, protects against the accumulation of moisture. The containers are lightweight, capable of easy material handling, are reusable for an indefinite period, and have pressure relief capabilities which permit them to be transported at high altitude. Moreover, the use of the flexible foam rubber interior supports, with an elliptical shape to support a circular article, provides a preload to insure against any damage resulting from loose packaging.

Many modifications and adaptations will at once become apparent to persons skilled in the art. It is intended, therefore, that this invention be limited only by the appended claims as read in the light of the prior art.

What is claimed is:
1. A container for a heavy article such as an engine, the combination comprising:
   a rigid foam exterior casing, said exterior casing comprising upper and lower complementary portions;
   a compressible seal between said complementary portions;
   a flexible foam interior casing, said interior casing having a preformed configuration approximately complementary to the configuration of said article, said interior casing being comprised of at least one lower support and one upper support for said article; and
   a sealable, vaporproof, plastic barrier bag intermediate said exterior and said interior casings, said plastic barrier bag enclosing both said article and said interior casing.
2. The invention as defined in claim 1, and a fiber glass fabric liner molded into the surfaces of said exterior casing.
3. The invention as defined in claim 2, and a desiccant in said bag.
4. The invention as defined in claim 3, and a pressure relief valve communicating between the interior of said bag and the outside of said exterior casing.
5. The invention as defined in claim 4 wherein a humidity indicator is provided in a space communicating with the inside of said bag; and
   means for viewing said indicator from the outside of said exterior casing.
6. The invention as defined in claim 5, and pairs of straps molded into each of said halves for closing said exterior casing halves.

References Cited
UNITED STATES PATENTS

| | | | |
|---|---|---|---|
| 655,883 | 8/1900 | Middleby. | |
| 2,674,509 | 4/1954 | Barnet | 206—46 |
| 2,971,640 | 2/1961 | Snelling | 206—46 |
| 3,222,843 | 12/1965 | Schneider | 206—46 |
| 3,298,345 | 1/1967 | Pratt | 270—9 |
| 607,826 | 7/1898 | Burger et al. | |
| 2,459,400 | 1/1949 | Williams | 206—46 |
| 2,594,586 | 4/1952 | Ries | 206—46 X |
| 2,780,350 | 2/1957 | Simon et al. | |
| 2,939,603 | 6/1960 | Young | 220—83 X |
| 3,069,041 | 12/1962 | Musso et al. | 220—9 |
| 3,120,319 | 2/1964 | Bruddrus | 215—13 |
| 3,181,311 | 5/1965 | Latzer | 220—9 XR |
| 3,259,264 | 7/1966 | Best et al. | 220—9 XR |

THERON E. CONDON, *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,401,791                  September 17, 1968

William A. Stott et al.

It is certified that error appears in the above identified patent and that said Letters Patent are hereby corrected as shown below:

In the heading to the printed specification, line 5, "assignors" should read -- said Stott assignor --.

Signed and sealed this 3rd day of February 1970.

(SEAL)
Attest:

Edward M. Fletcher, Jr.                  WILLIAM E. SCHUYLER, JR.

Attesting Officer                           Commissioner of Patents